United States Patent
Roa et al.

(10) Patent No.: US 11,571,013 B2
(45) Date of Patent: Feb. 7, 2023

(54) STARCH-BASED TEXTURIZERS FOR FOOD COMPOSITIONS

(71) Applicant: Corn Products Development, Inc., Westchester, IL (US)

(72) Inventors: Brandon Roa, Bridgewater, NJ (US); Erhan Yildiz, Bridgewater, NJ (US); David Stevenson, Bridgewater, NJ (US); William Anthony, Bridgewater, NJ (US)

(73) Assignee: Corn Products Development, Inc., Westchester, IL (US)

( * ) Notice: Subject to any disclaimer, the term of this patent is extended or adjusted under 35 U.S.C. 154(b) by 236 days.

(21) Appl. No.: 16/464,151

(22) PCT Filed: Nov. 21, 2017

(86) PCT No.: PCT/US2017/062849
§ 371 (c)(1),
(2) Date: May 24, 2019

(87) PCT Pub. No.: WO2018/098179
PCT Pub. Date: May 31, 2018

(65) Prior Publication Data
US 2020/0288760 A1 Sep. 17, 2020

Related U.S. Application Data

(60) Provisional application No. 62/426,755, filed on Nov. 28, 2016.

(51) Int. Cl.
| | | |
|---|---|---|
| A23L 29/212 | (2016.01) | |
| A23C 9/137 | (2006.01) | |
| A23C 9/154 | (2006.01) | |
| A23D 7/005 | (2006.01) | |

(52) U.S. Cl.
CPC ............ *A23L 29/212* (2016.08); *A23C 9/137* (2013.01); *A23C 9/1544* (2013.01); *A23D 7/0053* (2013.01); *A23V 2002/00* (2013.01)

(58) Field of Classification Search
CPC ..... A23L 29/212; A23C 9/137; A23C 9/1544; A23D 7/0053
USPC ........................................................ 426/578
See application file for complete search history.

(56) References Cited

U.S. PATENT DOCUMENTS

| | | |
|---|---|---|
| 5,932,639 A | 8/1999 | Eden et al. |
| 6,054,302 A | 4/2000 | Shi et al. |
| 6,090,594 A | 7/2000 | Kettlitz et al. |
| 6,623,943 B2 | 9/2003 | Schmiedel et al. |
| 6,890,579 B2 | 5/2005 | Buwalda et al. |
| 6,896,915 B2 | 5/2005 | Shi et al. |
| 7,829,600 B1 | 11/2010 | Trksak et al. |
| 2009/0017186 A1 | 1/2009 | Henault-Mezaize et al. |

FOREIGN PATENT DOCUMENTS

| | | | |
|---|---|---|---|
| EP | 0688872 | 3/1999 | |
| EP | 1075193 B1 | 8/2004 | |
| JP | 2013139581 A * | 7/2013 | ........... A23L 29/219 |
| WO | 200121011 | 3/2001 | |

OTHER PUBLICATIONS

Cai, Liming; Shi, Yong-Cheng, "Preparation, structure, and digestibility of crystalline A- and B-type aggregates from debranched waxy starches", Carbohydrate Polymers V105, p. 341-350 (2014).
Cai, Liming; Bai, Yanjie; Shi, Yong-Cheng, "Study on melting and crystallization of short-linear chains from debranched waxy starches by in situ synchrotron wide-angle X-ray diffraction", Journal of Cereal Science v55(3), p. 373-379 (2012).
Cai, Liming; Shi, Yong-Cheng, "Structure and digestibility of crystalline short-chain amylose from debranched waxy wheat, waxy maise, and waxy potato starches", Carbohydrate Polymers v79(4), p. 1117-1123 (2010).
Mcpherson, AE; Jane, J., "Comparison of waxy potato with other root and tuber starches", Carbohydrate Polymers V 40 (1) p. 57-70 (1999).

* cited by examiner

*Primary Examiner* — Jyoti Chawla
(74) *Attorney, Agent, or Firm* — Rachael Casey

(57) ABSTRACT

Disclosed herein is one or more food compositions comprising at least one edible ingredient and a texturizing agent comprising an inhibited starch and a non-granular, enzymatically-debranched waxy potato starch. Also disclosed herein is a process for making said food compositions, the method comprising adding a texturizing agent comprising an inhibited starch and a non-granular, enzymatically-debranched waxy potato starch to the composition, wherein an effective amount of the texturizing agent is added to thicken the food composition. The texturizing agent can be used to replace protein and/or fat in said one or more food compositions.

9 Claims, No Drawings

STARCH-BASED TEXTURIZERS FOR FOOD COMPOSITIONS

CROSS-REFERENCE TO RELATED APPLICATIONS

This application is a US National Stage under 35 USC § 371 of International Application No. PCT/US2017/062849, filed Nov. 21, 2017, which claims priority to U.S. Provisional Patent Application Ser. No. 62/426,755, filed Nov. 28, 2016, which is hereby incorporated herein by reference in its entirety.

Disclosed herein is one or more food composition comprising at least one edible ingredient and a texturizing agent comprising an inhibited starch and a non-granular, enzymatically-debranched waxy potato starch. Also disclosed herein is a process for making said one or more food compositions, the method comprising adding a texturizing agent comprising an inhibited starch and a non-granular, enzymatically-debranched waxy potato starch to the composition, wherein an effective amount of the texturizing agent is added to thicken the food composition. The texturizing agent described herein has improved efficacy in food compositions, and, as such, can replace costly proteins and/or fats contained in the food composition to reduce manufacturing costs.

Texturizing agents play a key role in adding high value to innovative food preparations. They are added to food to modify overall texture and bring a change in the mouthfeel of foods, as well as in their appearance. There is a wide variety of texturing agents for use in food applications, including cellulose derivatives, gums, pectins, gelatins, algae extract, milk proteins, inulin and starch. These texturizing agents are used in a wide variety of food applications such as dairy products, confectionaries, baked goods, snacks, meats, pet foods, beverages, sauces, soups and dressings. These texturizing agents help improve gelling, thickening, stability, clarity, binding, consistency, and shelf-life in many food applications, among other functions.

Starch is a key texturizing agent used in food products. Due to rising manufacturing and ingredient costs, food producers are interested in reducing costs while maintaining the textural attributes consumers expect. Disclosed herein is a lower cost starch-based food texturizer that produces food compositions with the textural attributes desired by consumers.

Disclosed herein is one or more food composition comprising at least one edible ingredient and a texturizing agent, wherein the texturizing agent comprises an inhibited starch and a non-granular, enzymatically-debranched waxy potato starch. In another embodiment, the food composition comprises at least one edible ingredient and a texturizing agent, wherein said texturizing agent comprises an inhibited starch and a non-granular, enzymatically-debranched waxy potato starch, with the proviso that said food composition does not contain one or more other texturizing agent or with the proviso that said texturizing agent is the sole texturizing agent in the composition. In one embodiment, the texturizing agent is present in an amount effective to thicken, gel, or thicken and gel one or more food composition described herein. In a further embodiment, the texturizing agent described herein is present in the food composition in an amount of about 0.5% to about 15.0%, about 1.0% to about 12.0%, about 1.0% to about 10.0%, or about 10.0% or less by weight of the food composition. In still another embodiment, the texturizing agent is the sole texturizing agent in the food composition.

In a still further embodiment, the inhibited starch and the non-granular, enzymatically-debranched waxy potato starch are present in the texturizing agent described herein in a weight ratio of about 1.0:1.0 to about 19.0:1.0, from about 13.0:7.0 to about 9.0:1.0, from about 3.0:1.0 to about 17.0:3.0, or about 3.0:1.0 inhibited starch to non-granular, enzymatically-debranched waxy potato starch. In yet another embodiment, the non-granular, enzymatically-debranched waxy potato starch has a dextrose equivalent (DE) of about 10.0 or less, from about 2.0 to about 9.0, from about 2.5 to about 8.0, from about 3.0 to about 7.0, from about 3.5 to about 5.0, or from about 4.0 to about 5.0. In a further embodiment, the non-granular, enzymatically-debranched waxy potato starch is only partially debranched. In yet another embodiment, the non-granular, enzymatically-debranched waxy potato starch is debranched with an $\alpha$-1,6-D-glucanohydrolase. Still yet a further embodiment is directed to a texturizing agent comprising an inhibited starch and a non-granular, enzymatically-debranched waxy potato starch, wherein the weight ratio of inhibited starch to non-granular, enzymatically-debranched waxy potato starch is from about 1.0:1.0 to about 19.0:1.0, and wherein the non-granular, enzymatically-debranched waxy potato starch has a dextrose equivalent of about 10.0 or less or from about 4.0 to about 5.0.

Exemplary food compositions containing the texturizing agent described herein include, but are not limited to, for example, yogurt compositions; cheese compositions; cream cheese compositions; dairy dessert compositions; and oil-in-water emulsion compositions, such as, e.g. spreadable dressings and reduced fat mayonnaise. In one embodiment, the food composition containing the texturizing agent described herein is selected from a yogurt composition, cheese composition, cream cheese composition, dairy dessert composition, and oil-in-water emulsion composition.

Also provided herein is a method for making one or more food composition described herein. Further provided herein is one or more texturizing agent for use in one or more food compositions described herein.

Disclosed herein is one or more food composition containing at least one edible ingredient and a texturizing agent comprising an inhibited starch and an enzymatically debranched waxy potato starch. The texturizing agent described herein provides a combination of starches that acts synergistically to produce the same gel strength and mouthfeel in a variety of food formulations at a reduced amount or concentration of texturizing agent compared to currently available starch-based texturizers, thereby reducing overall manufacturing costs.

In one embodiment, the inhibited starch has substantial native granule integrity and has been inhibited so that under the processing conditions of preparing a food composition the starch will substantially retain granule integrity. In another embodiment, the predominant granule integrity of the starch is not destroyed, and will most likely be swollen and exhibit a reduced degree of crystallinity, if any. In another embodiment, the starch retains at least part of its granular structure, thereby exhibiting at least some intact starch granules, although some granule fragmentation is acceptable and typical to processes involving homogenizers or other high shear processing. Such fragmentation can occur in larger inhibited starch granules such as potato starch during product processing (e.g., homogenization), yet the inhibited starch fragments can still provide a viscosifying effect in the end product.

In one embodiment, the inhibited starch described herein is derived from a native starch found in nature. In another embodiment, the native source from which the inhibited starch is derived is selected from a cereal, e.g., wheat, corn or maize, rice, and oat; tubers and roots, e.g., potato and tapioca; legumes; and fruits. In another embodiment, the inhibited starch described herein is derived from a plant obtained by standard breeding techniques, including, but not limited to, for example, crossbreeding, translocation, inversion, transformation, insertion, irradiation, chemically or other induced mutation, and any other method of gene or chromosome engineering to include variations thereof. In addition, inhibited granular waxy starch derived from a plant grown from induced mutations and variations of the above generic composition that can be produced by known standard methods of mutation breeding are also suitable herein. It is understood that the source of the enzymatically-debranched waxy potato starch can also be obtained by these techniques.

In one embodiment, the inhibited starch is any starch variety, including low amylose (waxy) varieties. In another embodiment, the inhibited starch is a starch variety selected from corn, rice, tapioca, cassava, potato, wheat, waxy corn, waxy potato, waxy sweet potato, waxy barley, waxy wheat, waxy rice, waxy sago, waxy amaranth, waxy tapioca, waxy arrowroot, waxy canna, waxy pea, waxy banana, waxy oat, waxy rye, waxy triticale, and waxy sorghum. By "waxy" or "low amylose" is meant a starch which has an amylopectin content of at least about 90%, at least about 95%, at least about 97%, or at least about 99%, amylopectin, and/or less than about 10%, less than about 5%, less than about 3%, or less than about 1%, amylose by weight.

Inhibition of the starch used in one or more food composition described herein can be accomplished by a variety of known methods. Inhibition includes both chemical and physical (thermal) inhibition. In one embodiment, the inhibited starch is a thermally inhibited starch. As used herein, the phrase "thermally inhibited starch" means a starch subjected to a heat treatment process that results in the starch becoming and remaining inhibited.

In one embodiment, the starch granule is inhibited by chemically crosslinking the granule with a food grade crosslinking reagent. Such crosslinking toughens the granule so that on swelling, the integrity of the swollen granule is maintained. Useful crosslinking reagents include a phosphate-based crosslinking reagent, such as, for example, a soluble metaphosphate (e.g., sodium trimetaphosphate (hereinafter STMP)); phosphorous oxychloride (hereinafter $POCl_3$); and linear dicarboxylic acid anhydrides. In one embodiment, the crosslinking reagent is $POCl_3$, STMP or adipic-acetic anhydride. The crosslinked starch can be further modified by, for example, derivatization. Crosslinking can be conducted using methods known in the art. The amount of crosslinking can vary depending upon the desired viscosity, but preferably the starch is moderately to highly crosslinked. The specific conditions employed in crosslinking depend upon the type of crosslinking agent used, the type of base starch employed, the reaction scale utilized, and so forth.

It will be appreciated by one of ordinary skill in the art that an increased level of crosslinking is generally obtained by use of increased amounts of crosslinking reagent. However, others factors such as length of time of reaction (longer time promotes crosslinking), pH of reaction medium (higher pH promotes crosslinking) and conditions of drying (longer time and/or higher drying temperatures promote crosslinking) will also affect the degree of crosslinking, and thus, degree of inhibition, except when the reaction medium is neutralized or made mildly acidic (e.g., pH of 5 to 6), or the product starch is washed to a neutral pH before drying.

When the crosslinking agent utilized is $POCl_3$, the degree of crosslinking will be at least about 0.01 at least about 0.02%, from about 0.01% to about 0.08%, from about 0.02% to about 0.05%, or from about 0.03% to about 0.045% by weight of phosphorus oxychloride reagent used to cross-link the starch. Weight percentages are by weight of the starch. The use of other crosslinking agents should be in amounts sufficient to provide equivalent levels of crosslinking.

Starch inhibition can be characterized by Brabender curves. For a highly inhibited starch, the Brabender curve will be flat, indicating that the starch or flour is so inhibited that it is resisting any further gelatinization, or the curve will be a rising Brabender curve, indicating that gelatinization is occurring at a slow rate and to a limited extent. For a less inhibited starch, the Brabender curve will be a dropping curve, but the overall breakdown in viscosity from the peak viscosity will be lower than that for a non-inhibited starch.

The inhibited starch can optionally be further treated by a combination of modifications in any order, provided the modification does not destroy the granular nature of the starch. Such additional modifications include, without limitation, stabilization, acetylation, esterification, hydroxyethylation, hydroxypropylation, phosphorylation, cationic modification, anionic modification, and so forth. Base starches suitable for subsequent modification also optionally include starches prepared by oxidation, enzyme conversion, acid hydrolysis, heat and/or acid dextrinization, thermal and/or sheared starches.

In one embodiment, the inhibited starch is further modified to obtain extended shelf-life in the food formulation; that is, the starch is stabilized. The starch can be stabilized by any of a variety of means, including substitution with STPP, succinic anhydride, acetyl or hydroxypropyl groups. Acetylation adds acetyl groups to the crosslinked starch, thereby inhibiting syneresis of, for example, a yogurt. Stabilization of the starch can occur after crosslinking by making the pH of the reaction slurry mildly alkaline and then adding the stabilizing agent (e.g., acetic anhydride). In one embodiment, the stabilizing agent is added to the reaction slurry in an amount of from about 0.5% to about 10.0%, from about 0.75% to about 8.0%, or from about 1.0% to about 7.0% by weight of the starch granule.

In one embodiment, the inhibited starch is a food quality starch in which the starch is modified by both crosslinking and stabilization. In another embodiment, the inhibited starch is a stabilized and cross-linked starch selected from hydroxypropylated distarch phosphate, acetylated distarch adipate, and waxy maize starch having at least one recessive sugary-2 allele that is subsequently chemically crosslinked or thermally inhibited.

In one embodiment, the inhibited starch is a hydroxypropylated distarch phosphate with a degree of substitution of from about 3.5% to about 8.8% or about 5.7% to about 6.7% by weight of the bound propylene oxide on starch. In another embodiment, the degree of cross-linking is at least about 0.01%, from about 0.01% to about 0.08%, from about 0.02% to about 0.05%, or from about 0.03% to about 0.045% by weight of phosphorus oxychloride reagent used to crosslink the starch. Weight percent is based on weight of the starch. As used herein, "food quality starches" are starches that are edible by animals, including human beings.

The enzymatically-debranched waxy potato starch can be prepared by the following process. A starch suspension or slurry is prepared from native waxy potato starch and water in a concentration of about 5% to about 50% starch solids by weight of the slurry. This suspension or slurry is gelatinized by heating (e.g., by jet-cooking) and then cooled. The pH of this cooled suspension is adjusted—depending upon the requirements of the enzyme chosen to debranch the starch—to a pH of from about 3.0 to about 7.5. This pH-adjusted suspension is then mixed with a debranching enzyme (e.g., isoamylase EC.3.2.1.68, pullulanase EC. 3.2.1.41 and/or other debranching enzymes) and heated to a temperature suitable for the chosen debranching enzyme (typically from about 25° C. to about 75° C., more typically about 60° C.+/−2° C.). The mixture is stirred until the desired degree of debranching is obtained, and the suspension then heated to inactivate the debranching enzyme(s) (e.g., to about 130° C. to about 150° C.). Typical debranching parameters include addition of the debranching enzyme in an amount of from about 0.01% to about 5.00%, from about 0.05% to about 2.00%, or from about 0.10% to about 0.75% by weight of anhydrous starch added to the reaction mixture, and a debranching period of from about 3.5 hours to about 25.0 hours or from about 10.0 hours to about 20.0 hours. These debranching parameters are ultimately dependent upon enzyme dosage concentration and the desired amount of debranching. Optionally, the starch can be isolated by drying (e.g., by spray-drying).

As noted above, the enzymatically-debranched waxy potato starch described herein is prepared using a debranching enzyme. In one embodiment, the debranching enzyme rapidly hydrolyzes only the α-1,6-D-glucosidic bonds, releasing short chain amylose. In another embodiment, the debranching enzyme is an α-1,6-D-glucanohydrolase. In still another embodiment, the α-1,6-D-glucanohydrolase is an isoamylase EC.3.2.1.68, pullulanase EC. 3.2.1.41, or combination thereof. In still yet another embodiment, the α-1,6-D-glucanohydrolase enzyme is an endo-enzyme capable of hydrolyzing the α-1,6-D-glucosidic linkages of the starch molecule, and incapable of any significant degree of hydrolysis of the α-1,4-D-glucosidic bonds.

In one embodiment, the enzymatically-debranched waxy potato starch is incompletely or only partially debranched and, thus, contains amylopectin, which has residual branching. For example, depending on the end use and the starch source selected, the starch may be debranched by treatment with an alpha-1,6-D-glucanohydrolase until up to 65%, by weight, of the starch has been debranched to short chain amylose. In another embodiment, the enzymatically-debranched waxy potato starch contains up to 65%, by weight, short chain amylose. The degree of debranching of the debranched waxy potato starch is determined by its dextrose equivalent ("DE"), which is a measure of the amount of reducing sugars present in a sugar product, relative to dextrose, expressed as a percentage on a dry basis. A higher degree of debranching is typically indicated by a higher DE. In one embodiment, the DE of the enzymatically-debranched waxy potato starch is about 10.0 or less, from about 2.0 to about 9.0, from about 2.5 to about 8.0, from about 3.0 to about 7.0, from about 3.5 to about 5.0, or from about 4.0 to about 5.0. In another embodiment, the DE of the enzymatically-debranched waxy potato starch is about 10.0 or less, from about 2.0 to about 9.0, from about 3.5 to about 5.0, or from about 4.0 to about 5.0. In still another embodiment, the DE of the enzymatically-debranched waxy potato starch is from about 3.5 to about 5.0 or from about 4.0 to about 5.0. In yet still another embodiment, the DE of the enzymatically-debranched waxy potato starch is about 10.0 or less or from about 4.0 to about 5.0. In one embodiment, the DE is determined as set forth in Example 1b.

In one embodiment, a good correlation exists between the DE of the enzymatically-debranched waxy potato starch and the gel strength exhibited by gels of such starches in a model aqueous system as well as in food formulations. The model aqueous system can simply be an aqueous dispersion of the enzymatically-debranched waxy potato starch in water at 8% to 10% solids by weight. Thus, DE is an excellent indicator of the enzymatically-debranched waxy potato starches that will provide the strongest gels.

In one embodiment, the texturizing agent described herein comprises an inhibited starch and a non-granular, enzymatically-debranched waxy potato starch in a weight ratio of inhibited starch to non-granular enzymatically-debranched waxy potato starch of from about 1.0:1.0 to about 19.0:1.0, about 1.0:1.0 to about 4.0:1.0, from about 13.0:7.0 to about 9.0:1.0, from about 3.0:1.0 to about 17.0:3.0, or about 3.0:1.0. In another embodiment, the inhibited starch and non-granular, enzymatically-debranched waxy potato starch are present in the texturizing agent in a weight ratio of from about 1.0:1.0 to about 19.0:1.0. In still another embodiment, the inhibited starch and non-granular, enzymatically-debranched waxy potato starch are present in the texturizing agent in a weight ratio of about 1.0:1.0 to about 4.0:1.0. In yet still another embodiment, the inhibited starch and non-granular, enzymatically-debranched waxy potato starch are present in the texturizing agent in a weight ratio of about 3.0:1.0.

In one embodiment, the texturizing agent described herein is present in the food composition in an amount of about 0.5% to about 15.0%, about 1.0% to about 12.0%, about 1.0% to about 10.0%, about 10.0% or less by weight of the food composition. In another embodiment, the texturizing agent described herein is present in the food composition in an amount of about 10.0% or less by weight of the food composition. In another embodiment, the texturizing agent described herein is present in the food composition in an amount of about 0.5% to about 15.0%, more typically about 1.0% to about 12.0%, and even more typically about 1.0% to about 10.0% by weight of the food composition.

In one embodiment, the components of the texturizing agent described herein are not pre-blended prior to incorporation into a food composition and, thus, are separately added to the food composition.

In another embodiment, the texturizing agent described herein finds use in a wide variety of food compositions. In a further embodiment, the food composition containing the texturizing agent described herein is selected from a yogurt composition; a cheese product composition, e.g., solid cheese compositions and cream cheese compositions; a dairy dessert composition; and an oil-in-water emulsion composition, e.g., spreads and dressings. In a still further embodiment, the food composition containing the texturizing agent described herein is selected from a yogurt composition, cheese composition, cream cheese composition, dairy dessert composition, and oil-in-water emulsion composition.

Yogurt Compositions

One embodiment is directed to a yogurt composition comprising at least one dairy ingredient and a texturizing agent, wherein the texturizing agent comprises an inhibited starch and a non-granular, enzymatically-debranched waxy potato starch, and, optionally, wherein said composition comprises an effective amount of the texturizing agent to gel the yogurt, wherein said yogurt composition is gelled. In one embodiment, the yogurt composition described herein is any style or type of yogurt composition. In another embodiment, the yogurt composition described herein is a set, stirred or concentrated type yogurt composition. In still another embodiment, the yogurt composition described herein is a set or stirred type composition.

Another embodiment is directed to a method of making a yogurt composition comprising mixing together at least one dairy ingredient and at least one texturing agent to form a yogurt base, wherein the texturizing agent comprises an inhibited starch and a non-granular, enzymatically-debranched waxy potato starch, and, optionally, wherein an effective amount of the texturizing agent is added to gel the yogurt.

Very generally, yogurt typically comprises a cultured milk product produced by culturing at least one dairy ingredient to form a yogurt base with a characterizing bacterial culture. The bacterial culture typically contains *Lactobacillus bulgaricus* and *Streptococcus thermophilus*. The culture may optionally comprise additional culture specie(s) as is known in the art such as *Lactobacillus acidophilus* and/or *bifidus*. Alternatively, the dairy ingredient(s) can be directly acidified, for example, to a pH of about 3.5 to about 5.0 or about 4.1 to about 4.7.

By "yogurt" is meant an acidified food product containing at least one dairy ingredient and having a gelled texture, including acidified food products that do and do not meet the standard identity for yogurt. By "dairy product or dairy ingredient" is meant a food product that contains milk, at least one product derived from milk, or at least one dairy alternative ingredient derived from grain or plant sources, including, but not limited to, for example, rice milk, soy milk, hemp milk, coconut milk, almond milk, and peanut milk.

Dairy ingredients used in forming the yogurt product are first blended to form a yogurt base and optionally deaerated, heated and homogenized. This yogurt base is pasteurized at high temperatures and then cooled to culturing temperatures of about 40° C. to about 50° C. The pasteurized, cooled yogurt base is then inoculated with culture and fermented to a desired acid content or titratable acidity and pH of about 3.5 to about 5.0 or about 4.1 to about 4.7, at which curdling or coagulation occurs which forms the yogurt. Acid development and bacterial growth are then arrested by cooling the mixture, generally to a filling temperature of about 0° C. to about 15° C. or 0° C. to 5° C., and storing at these refrigeration temperatures.

In one embodiment, at least one yogurt composition described herein contains a gelling amount of a texturizing agent comprising an inhibited starch and a non-granular, enzymatically-debranched waxy potato starch. In another embodiment, at least one yogurt composition described herein contains an effective amount of the texturizing agent described herein to provide a yogurt composition having a soft gelled texture. A useful measure of the gelling of the yogurt is the gel strength test, described below, in which the resistant force against a plunging probe is measured. By "gel strength" is meant a gel strength that is measured prior to any heating of the gel that is sufficient to melt the non-granular, enzymatically-debranched waxy starch described herein. In one embodiment, the gel strength of a yogurt, dairy dessert, or cream cheese is measured in accordance with the respective methods set forth in Example 1g.

In one embodiment, the yogurt base comprises less than about 10% by weight of the texturizing agent, e.g. from about 0.5% to about 10% by weight. In another embodiment, the yogurt base comprises from about 1% to about 8% by weight, from about 1.5% to 7.0%, or from about 2% to about 6% of the texturizing agent.

In one embodiment, the texturizing agent described herein is the sole gelling agent (other than any dairy protein that may be present) in the yogurt composition. Optionally, the yogurt base can additionally comprise modest amounts of additional supplemental stabilizers. Useful optional stabilizers can include gelatin, gum acacia, carrageenan, gum karaya, pectin, gum Tragacanth, xanthan, maltodextrins, or mixtures thereof. These supplemental stabilizers are well known food ingredients and are commercially available.

Cheese Compositions

Another embodiment is directed to a cheese composition comprising at least one dairy ingredient and a texturizing agent, wherein the texturizing agent comprises an inhibited starch and a non-granular, enzymatically-debranched waxy potato starch, wherein said texturizing agent is present in an amount effective to increase the firmness of said composition. Examples of cheese compositions include, but are not limited to, mozzarella, cheddar, parmesan, and colby cheese. In one embodiment, the cheese composition is sufficiently firm so that it can be sliced, cut, shredded or grated. In a further embodiment, the composition is grated or shredded mozzarella cheese.

Yet another embodiment is directed to a method of making a cheese composition comprising incorporating a texturizing agent comprising an inhibited starch and a non-granular, enzymatically-debranched waxy potato starch into a solid cheese composition containing at least one dairy ingredient, wherein an effective amount of the texturizing agent is added to increase the firmness of the cheese composition.

In another embodiment, the cheese composition described herein is not a natural cheese. In still another embodiment, the cheese composition described herein is an imitation cheese, and as such is prepared from a base of conventional ingredients for such imitation cheese composition into which is incorporated the texturizing agent described herein.

Still a further embodiment is directed to a cheese composition comprising a) moisture in an amount of from about 40% to about 50% or at least about 30%, 35%, or 40% by weight of the composition; b) the texturizing agent described herein in an amount of from about 2% to about 4% or at least about 1.5% by weight of the composition; c) casein or caseinate in an amount of from about 3% to about 30%, from about 10% to about 20, or at least about 3% by weight of the composition; d) a fat source of from about 20% to about 30% or at least about 10% by weight of the composition; and e) an emulsification salt of from about 0.5 to about 1.5% or at least about 0.01% by weight of the cheese composition.

In a still a further embodiment, the cheese composition described herein contains the texturizing agent described herein in an amount calculated to replace at least about 20%, at least about 25%, at least about 30%, at least about 35%, at least about 40% or at least about 45% by weight of the casein or caseinate present in an equivalent cheese product.

In yet a still a further embodiment, the cheese composition described herein optionally contains at least one additional GRAS (Generally Regarded as Safe) ingredient. In yet another embodiment, the optional additional GRAS ingredient is selected from at least one natural or artificial flavor ingredient, at least one natural or artificial color, at least one preservative, and at least one acidulant.

In still an even further embodiment, the texturizing agent contained in the cheese composition described herein comprises the non-granular enzymatically-debranched waxy potato starch in an amount of from about 0.5% to about 15%, from about 0.5% to about 5%, from about 1% to about 4%, or from about 1.5% to about 3% by weight of the solid cheese composition and/or the inhibited starch in an amount of from about 0.25% to about 4.0%, from about 0.5% to about 3.5%, or from about 0.75% to about 2.5% by weight of the cheese composition. In one aspect, the texturizing agent described herein is the sole gelling agent in the cheese composition (other than any dairy protein that may be present).

In another embodiment, the texturizing agent comprises one or more other secondary starch and/or maltodextrin conventionally used in cheese compositions. In a further embodiment, the other secondary starch is added in any amount needed to obtain the functionality of the composition. In still a further embodiment, the secondary starch is added in an amount of about 0.5% to about 5.0% by weight, based on the cheese composition.

In yet another embodiment, the cheese composition described herein contains a fat source from an animal, vegetable, or mixture thereof, wherein said fat source can be liquid or solid at room temperature (e.g., 21° C.). Exemplary fat sources include, but are not limited to, lard, butter, cream, double cream, anhydrous milk fat ("AMF"), liquefied fresh frozen milk fat for recombining ("FFMR"), fully saturated vegetable oils, partially hydrogenated vegetable oils, non-hydrogenated vegetable oils, soybean oil, sunflower oil, olive oil, canola (rapeseed) oil, cottonseed oil, coconut oil, palm kernel oil, corn oil, butterfat, safflower oil, and mixtures thereof. Examples of typical fats include, but are not limited to, butter and partially hydrogenated vegetable oil, soybean oil or a mixture thereof. In some embodiments, the fat source can include butterfat to improve the flavor of the solid cheese composition. In one embodiment, the fat source is selected from cream, double cream, butter, AMF, liquefied FFMR, and a non-dairy fat such as vegetable oil.

In a further embodiment, the cheese composition comprises an effective amount of fat, wherein an effective amount is the amount needed to provide the desired texture and consistency. In some embodiments, the cheese composition comprises fat in an amount of at least about 10%, about 15% to about 35%, or about 20% to about 30% by weight of the composition. In other embodiments, part of the fat (e.g., typically from about one third to about two thirds of the foregoing amounts of fat) is replaced with an additional amount of the texturizing agent described herein, depending on the degree of firmness desired and the amount of fat replaced.

In another embodiment, the cheese composition further comprises at least one emulsification salt selected from mono, di or polyvalent cationic citrate or phosphate salts; sodium stearoyl lactylate; glycerol esters; acid pyrophosphate; fatty acid esters such as polysorbates; phospholipids such as lecithins; and mixtures thereof. Suitable commercially available emulsification salts include trisodium citrate (TSC), lactylate, sodium hexametaphosphate (SHMP), disodium phosphate (DSP) and blends of sodium polyphosphate (SPP) and sodium orthophosphate (SOP). In one embodiment, the emulsification salt is a mono, di or polyvalent cationic citrate or phosphate salt. In another embodiment, at least one cheese composition described herein comprises an emulsification salt in an effective amount to disperse the fat evenly throughout the composition in an emulsified form. In yet another embodiment, the emulsification salt is present in an amount of about 0.5% to about 1.5% by weight of the dairy protein in the composition. In still another embodiment, the emulsification salt is present in the solid cheese composition in an amount of at least 0.01%, at least about 0.05% to about 2.5%, or about 0.75% to about 1.25% by weight of the composition.

Cream Cheese Compositions

Another embodiment is directed to a cream cheese composition comprising a dairy ingredient and a texturizing agent comprising an inhibited starch and a non-granular, enzymatically-debranched waxy potato starch, wherein said composition comprises an effective amount of the texturizing agent to provide a firm composition, wherein said cream cheese composition is firm. In a further embodiment, the texturizing agent described herein produces cream cheese with excellent texture, firmness, and creaminess.

Another embodiment is directed to a method of making a cream cheese composition by mixing together at least one dairy ingredient and a texturizing agent comprising an inhibited starch and a non-granular, enzymatically-debranched waxy potato starch, wherein an effective amount of said texturizing agent is added to increase the firmness of said cream cheese composition.

When producing a cream cheese composition, many of the same ingredients or ingredients similar to those used in making a cheese composition are used. In general, the amount of water used will be less and the amount of fat and protein will be greater. In this regard, the amount of water can be from about 15% to about 45%, about 20% to about 35%, or about 25% to about 30% by weight of the cream cheese composition. The amount of fat can be from about 15% to about 35% or from about 20% to about 30% by weight of the composition, and can be butter or milkfat in another form. The amount of protein can be from about 20% to about 50% or from about 30% to about 40% by weight of the composition, and can be fresh cheese curd. In some embodiments, the cream cheese composition contains one or more emulsification salts and acidulants.

Dairy Dessert Compositions

Another embodiment is directed to a dairy dessert composition comprising at least one dairy ingredient and a texturizing agent comprising an inhibited starch and a non-granular, enzymatically-debranched waxy potato starch, wherein said composition comprises an effective amount of the texturizing agent to provide a firm composition, wherein said dairy dessert composition is firm. In another embodiment, the texturizing agent described herein produces a dairy dessert composition with excellent texture, firmness, and creaminess.

Yet another embodiment is directed to a process for making a dairy dessert composition described herein, wherein said process comprises mixing together at least one dairy ingredient and a texturizing agent to form said dairy dessert composition, wherein said texturizing agent comprises an inhibited starch and a non-granular, enzymatically-debranched waxy potato starch, and further wherein an effective amount of said texturizing agent is added to the dairy dessert composition to increase the firmness of said composition.

Oil-in-Water Emulsions

Another embodiment is directed to an oil-in-water emulsion composition comprising a fat ingredient and a texturizing agent comprising an inhibited starch and a non-granular, enzymatically-debranched waxy potato starch, wherein said composition comprises an effective amount of the texturizing agent to increase the firmness of the oil-in-water emulsion composition, wherein said composition is firm. In one embodiment, the firmness of the oil-in-water emulsion composition is measured in accordance with the Viscosity Measurement set forth in Example 10.

One embodiment is directed to a process for making an oil-in-water emulsion composition, wherein said process comprises mixing together an oil-in-water emulsion composition containing a fat ingredient with a texturizing agent comprising an inhibited starch and a non-granular, enzymatically-debranched waxy potato starch, wherein an effective amount of said texturizing agent is added to increase the firmness of the oil-in-water emulsion. Yet another embodiment is directed to a process for making an oil-in-water emulsion, wherein said method comprises providing an oil in water emulsion base comprising at least one fat, and replacing at least a portion of the fat in the oil-in-water emulsion base with an effective amount of a texturizing agent comprising an inhibited starch and a non-granular, enzymatically-debranched waxy potato starch to increase the firmness of the oil-in-water emulsion.

Exemplary oil-in-water emulsion compositions include, for example, thick and spreadable dressings (e.g., spoonable mayonnaise), which can be used as a base and/or binder in coleslaw, potato salads, cold sauces (e.g., shrimp cocktail sauce), salad dressings (e.g., thousand island dressing), etc. Many consumers prefer low fat dressings that have the same functionality, taste and mouthfeel, particularly texture, of the full fat alternatives. The texturizing agent described herein facilitates the production of cost-effective oil-in-water emulsion compositions having reduced fat content as well as excellent texture and firmness. In a further embodiment, an effective amount of the texturizing agent is from about 0.5% to about 4%, from about 0.75% to about 3%, or from about 1.0% to about 2% by weight of the composition.

In one embodiment, the inhibited starch is added in any amount desired or necessary to provide a composition with the desired functionality. In another embodiment, the amount of inhibited starch is from about 0.5% to about 6%, from about 2% to about 6%, or from about 2.5% to about 5% by weight of the oil-in-water emulsion composition.

In one embodiment, the oil contained in the oil-in-water emulsion composition is an edible oil. In another embodiment, the oil is a vegetable oil. In yet another embodiment, the vegetable oil is selected from sunflower oil, canola oil, olive oil, soya oil, palm oil, and mixtures thereof. In an even further embodiment, the vegetable oil is canola oil.

In some embodiments, the oil-in-water emulsion composition comprises an amount of oil of from about 10% to about 80%, from about 15% to about 35%, or from about 15% to about 25% by weight of the oil-in-water emulsion composition.

In other embodiments, at least one oil-in-water emulsion composition described herein comprises at least one water-based liquid. In still other embodiments, the water-based liquid is selected from water, vinegar, milk, and mixtures thereof. In still further embodiments, the water-based liquid is water, white wine vinegar, or mixtures thereof. In still yet other embodiments, the oil-in-water emulsion composition comprises an amount of water-based liquid of from about 30% to about 75% or from about 40% to about 70% by weight of the oil-in-water emulsion composition.

The term "non-starch hydrocolloid" when used in connection with the oil-in-water emulsion compositions described herein, refers to a substance comprising at least one particle that, when mixed with at least one water based liquid, is microscopically dispersed throughout the water-based liquid. Suitable non-starch hydrocolloids include, but are not limited to, for example, agar, carrageenan processed eucheuma algae, locust bean gum, guar gum, tragacanth, gum arabic, karaya gum, tara flour, cellulose, methyl cellulose, hydroxypropyl cellulose, hydroxypropyl methyl cellulose, ethyl methyl cellulose, carboxymethyl cellulose, sodium carboxymethyl cellulose, cross-linked sodium carboxy methyl cellulose, enzymatically hydrolyzed carboxymethyl cellulose, and mixtures thereof. In some embodiments, at least one oil-in-water emulsion composition described herein comprises a non-starch hydrocolloid.

In some embodiments, the oil-in-water emulsion compositions described herein comprises an amount of the non-starch hydrocolloid of from about 0.001% to about 2%, from about 0.05% to about 1%, or from about 0.1% to about 0.5%, by weight, of the oil-in-water emulsion composition.

In still another embodiment, the oil-in-water emulsion composition describe herein comprises egg, at least one egg derivative, an alternative emulsifier, or mixtures thereof. The term "egg derivative" refers to any product derived from egg. In further embodiments, the at least one egg derivative is an egg yolk (e.g., fresh, pasteurized, frozen or dried egg yolk). In still another embodiment, the at least one egg derivative is a pasteurized liquid egg yolk. In yet other embodiments, the alternative emulsifier is any suitable food ingredient emulsifier including, but not limited to, proteins (e.g., soy, pulses, dairy, etc.), lecithins (e.g. soy, egg, sunflower, etc.), hydrophobic starches (e.g., starch octenyl succinate esters), and gums/hydrocolloids (e.g. propylene glycol alginate, tamarind gum, pectin, etc.). In still yet other embodiments, the alternative emulsifier is selected from soy lecithin, soy protein, hydrophobic starches, and gums/hydrocolloids. In yet an even further embodiment, the alternative emulsifier is selected from soy proteins, pulse proteins, dairy proteins, soy lecithin, egg lecithin, sunflower lecithin, starch octenyl succinate esters, propylene glycol alginates, tamarind gums, and pectins.

In even further embodiments, the oil-in-water emulsion compositions describe herein comprise an amount of egg and/or egg derivative of from about 0.1% to about 10%, from about 1% to about 6%, or from about 2% to about 4% by weight of the oil-in-water emulsion composition. The addition of egg and/or at least one egg derivative has the additional advantage of providing an oil-in-water emulsion composition with the desired color/surface appeal. As will be appreciated by one of skill in this art, the use level of the alternative emulsifier will depend upon the type of emulsifier chosen, the precise oil loading of the emulsion, and the precise food system in which the emulsion is employed.

In another embodiment, the oil-in-water emulsion compositions described herein further comprise any ingredient typically used in an edible oil-in-water emulsion. Such further ingredients include, but are not limited to for example, salt, sugar, mustard, citrus fruit, and melt-based ingredients.

In some embodiments, the edible oil-in-water emulsion composition is selected from a mayonnaise, a spread, and a dressing. In one embodiment, the oil-in-water emulsion composition is a reduced fat mayonnaise, spread, or dressing. A "reduced fat mayonnaise, spread, or dressing" refers to a fat content that is lower than about 65%, 55%, or 45% by weight of the oil-in-water emulsion composition.

In one embodiment, the oil-in-water emulsion compositions described herein contain the ingredients mentioned above over a wide range of weight ratios. In some embodiments, the oil-in-water emulsion composition described herein comprises ingredients in the following weight ratios, based on the oil-in-water emulsion composition, of: from about 15% to about 25% or from about 18% to about 22% by weight of at least one oil; from about 50% to about 70% or from about 55% to about 65% by weight of at least one water based liquid; from about 0.5% to about 6% or from about 3% to about 5% by weight of at least one inhibited starch; from about 0.1% to about 5% or from about 0.5% to about 2% by weight of enzymatically-debranched waxy potato starch; and up to 5% or from 2% to 4% by weight egg, at least one egg derivative, or mixtures thereof.

In one embodiment, the oil-in-water emulsion compositions described herein contain food grade ingredients.

In another embodiment, the oil-in-water emulsion composition described herein, such as, e.g. low fat mayonnaise, is prepared by adding an emulsifier (typically egg or egg derivative, such as, e.g. egg-yolk) to the water-phase and/or to the oil-phase before starting emulsification. When an inhibited granular cook-up thickening starch is used, it can be added to the water phase and precooked before making the emulsion. When using a pregelatinized granular starch, it can be added via the oil-phase towards the end of the emulsification process.

Another embodiment is directed to a process for preparing an oil-in-water emulsion composition described herein, wherein said process comprises preparing a pre-emulsion water phase comprising at least one water based liquid, and, optionally, a sugar, salt, vinegar, mustard, and/or non-granular enzymatically-debranched waxy potato starch; mixing half of an oil into the pre-emulsion water-phase, and pre-mixing the other half of the oil with at least one hydrocolloid and at least one pregelatinized granular starch and/or a non-granular, enzymatically-debranched waxy potato starch to form an oil phase; emulsifying the pre-emulsion water phase with the oil phase; and introducing an egg and/or at least one egg derivative at the beginning of the emulsifying step.

A further embodiment is directed to a food product comprising an oil-in-water emulsion composition described herein. In another embodiment, the food product is selected from coleslaw, potato salad, shrimp cocktail, thousand island dressing, and vegetable salad.

EXAMPLES

The invention will now be described in more detail in the following examples, which should not be construed to limit the invention. All amounts, parts and percentages in the specification and claims are by weight, unless noted otherwise.

Example 1

Methods and Materials

1a. Production of Enzymatically-Debranched Waxy Potato Starch

A starch slurry for the enzymatic reaction was prepared by suspending 1.5 kg of waxy potato starch (ELIANE™ 100 waxy potato starch, available from Avebe, Veendam, The Netherlands) in 6 kg of tap water. This suspension was pre-acidified to a pH of 4.0 to 4.1 with aqueous hydrochloric acid and then jet-cooked at approximately 155-160° C. The solution was transferred directly into a double walled reactor heated to 58.5° C. and then pH-adjusted—if necessary—to a pH of 4.6 using aqueous hydrochloric acid (1M). The debranching enzyme (PROMOZYME D2 pullulanase, available from Novozymes A/S, Bagsvaerd, Denmark) was added at various wt. % concentrations, based on the anhydrous weight of the starch (20-25% starch solids), to the reaction mixture. After stirring at 100 rpm for various time periods, the enzyme was deactivated by jet cooking at greater than 140° C. The reaction mixture was then diluted with tap water and spray dried (250° C. inlet; 110° C. outlet), giving enzymatically-debranched waxy starch products having a typical moisture content of about 6%.

1b. Dextrose Equivalence Determination (Luff Schoorl Method)

Dextrose Equivalence ("DE") was determined based on the Luff Schoorl method as set forth in "ISI 28-1e Determination of Reducing Sugar, DE by Luff-Schoorl's Method", International Starch Institute, Science Park Aarhus, Denmark, Rev. LT 22 Jan. 2002. This method is based upon iodine titration of excess copper. More specifically, 0.5-1.0 g of enzymatically-debranched waxy potato ("EDWP") starch (as dry starch), 25.0 ml Luff-Schoorl reagent (available from Fischer Scientific), and 10 ml of demiwater are mixed together in flask and allowed to boil for 10 min from the point when the mixture begins boiling. The mixture is then cooled down by placing the flask in a waterbath for about 0.5 hrs. After cooling, 10 ml of potassium iodide (KI) solution and 25 ml of sulfuric acid ($H_2SO_4$) are added to the mixture and the mixture is titrated with sodium thiosulphate to a white solution.

The DE is calculated via the following equation: (e factor×100)/((100−moisture of the EDWP starch)×sample amount×1000). The e factor of the titrate for the used amount of sodium thiosulphate is determined by subtracting the used titrate from the blank (i.e. Blank—titrate). The blank is determined by repeating the above described titration process without adding the EDWP starch thereto. That is, the titration process excludes the addition of the EDWP starch to provide the blank.

1c. Method for Preparing Stirred Yogurt

Stirred yogurts were prepared in the following manner. The dry ingredients were blended together and added to one or more dairy ingredients and water and mixed together in a Breddo Likwifier blender (available from Breddo Likwifier, a Division of Caravan Ingredients Co., Kansas City, Mo., USA) for 15 minutes at 500 RPMs. This mixture was transferred to a holding/feed tank equipped with a Lightnin Mixer (available from SPC Corporation, Rochester, N.Y., USA) for constant agitation while feeding into a MicroThermics® Model 25-2S High-Temperature Short-Time processing equipment (available from MicroThermics, Inc., Raleigh, N.C., USA). In the upstream process, the mixture was homogenized at 65° C. and 100/30 Bar (1st/2nd stage) using a dual stage homogenizer (available from GEA Niro Soavi North America, Bedford, N.H., USA), and then pasteurized at 95° C. for 6 minutes. The mixture was then cooled to an inoculation temperature of 43° C.+/−2° and inoculated with 0.02% culture (TC-X11 Yogurt Culture, available from Chr. Hansen Holding A/S, Horsholm, Denmark). The inoculated mixture was incubated at 43° C. to reach a target pH of 4.5. The mixture was then smoothed and cooled to 20° C., and then stored at 4° C. in a refrigerator.

1d. Method for Preparing Dairy Desserts

Dairy desserts were prepared as follows. The dry ingredients were blended together and then combined with one or more dairy ingredients in a Thermomix model TM31 mixer (available from Vorwerk & Co., Wuppertal, Germany). This mixture was heated to 90° C. while mixing at speed 2. Once 90° C. was reached, the mixture was held at that temperature for 35 min and then poured into water-tight containers and cooled in an ice batch to approximately 25° C. (approximately room temperature). The samples were subsequently stored at 4° C.

1e. Method for Preparing Spoonable Dressings

Spoonable dressings were prepared as follows. A paste was prepared by blending the dry ingredients together and adding these blended ingredients to water and vinegar in a stainless steel beaker while stirring for complete dispersion. This mixture was heated in a boiling water bath while being lightly stirred for 6 mins. The beaker was removed from the water bath and the mixture cooled at ambient temperature overnight. Next, a coarse emulsion was prepared by mixing the paste and eggs in a Kitchen Aid mixing bowl for 2 mins on speed 2. The bowl was scraped and oil slowly added while mixing in the Kitchen Aid mixing bowl on speed 2 until all of the oil was incorporated into the mixture. The coarse emulsion was emulsified with a Scott Turbon Mixer, Laboratory Mixer Model M1110SE, (Scott Turbon Mixer, A Hayward Gordon Co., Adelanto, Calif.) for 2 minutes at 30 hertz and this thusly produced emulsion placed in 4 ounce plastic jars and stored at 22° C.

1f. Method for Preparing Cream Cheese

The cream cheese was prepared as follows. The dry powders, quark and butter were mixed well in a Stephan cutter (available from Stephan Machinery GmbH, Hameln, Germany) at 3000 rpm for 1 minute. Water was added to the cooker and heated to 50° C. The pH was checked and, if needed, adjusted to a pH of 5 to 5.2 and, after acid addition, the ingredients were mixed at 3000 rpm for 30 seconds. The mixture was then further heated to 85° C. with mixing at 1500 rpm. Pre-melt was added to the mixture, and the mixture creamed and mixed at 80-85° C. and 3000 rpm for 5 minutes. This mixture was then homogenized hot at high pressure (200/50 bars) using a Model MC2-6TBSX homogenizer (available from APV Gaulin GmbH, Lübeck, Germany). The homogenized mixture was filled into containers and the containers turned upside down to avoid skin formation. The mixture was then slowly cooled down to room temperature and then store at 4° C.

1g. Gel Strength Measurements

Measuring Gel Strength of Yogurt

Gel strength of yogurt samples was measured using a Texture Analyzer, Model TA.XT2 (available from Texture Technologies Corp., Hamilton, Mass., USA) as follows. Yogurt peak gel strength was tested at approximately 4° C. The reading was taken using a 35 mm height and 38 mm diameter aluminum cylinder at absolute peak force achieved during an 18 mm plunge into the sample. The probe moved through the sample at 0.2 mm/s. Measuring Gel Strength of Dairy Desserts Gel strength of dairy dessert samples was measured using a Texture Analyzer, Model TA.XT2 (available from Texture Technologies Corp., Hamilton, Mass., USA) as follows. Dairy dessert peak gel strength was tested at approximately 4° C. The reading was taken using a 1 inch diameter acrylic cylinder at absolute peak force achieved during a 15 mm plunge into the sample. The probe moved through the sample at 0.2 mm/s.

Measuring Gel Strength of Cream Cheese

Gel strength of cream cheese samples was measured using a Texture Analyzer, Model TA.XT2 (available from Texture Technologies Corp., Hamilton, Mass., USA) as follows. Cream cheese peak gel strength was tested at approximately 4° C. The reading was taken using a 35 mm height and 38 mm diameter aluminum cylinder at absolute peak force achieved during an 18 mm plunge into the sample. The probe moved through the sample at 0.2 mm/s.

1h. Starch Materials

The non-granular, EDWP starches used in the examples below were prepared as described above using the debranching times and enzyme dosages set forth in Table 1. Other starch material ("SM") used in the Examples below is described in Table 2.

TABLE 1

EDWP Starch Materials

| EDWP Starch | Enzyme Dosage (wt %) | Debranching Time (hours) | DE |
|---|---|---|---|
| 1 | 0.50 | 15.0 | 3.9 |
| 2 | 0.50 | 3.5 | 3.7 |

TABLE 2

Starch Materials

| Starch Material No. | Description |
|---|---|
| SM 1 | maltodextrin |
| SM 2 | Starch blend containing granular thermally inhibited starch |
| SM 3 | non-granular starch |
| SM 4 | non-granular starch |
| SM 5 | maltodextrin |
| SM 6 | instant inhibited starch |
| SM 7 | modified food starch |
| SM8 | modified food starch |

SM 1 = N-DULGE ® SA1 maltodextrin available from Ingredion Incorporated, Bridgewater, New Jersey, USA.
SM 2 = NOVATION ® Indulge 1720 starch, available from Ingredion Incorporated, Bridgewater, New Jersey, USA.
SM 3 = PRECISA ® 600 modified food starch, available from Ingredion Incorporated, Bridgewater, New Jersey, USA.
SM 4 = GEL-N-MELT ® modified food starch, available from Ingredion Incorporated, Bridgewater, New Jersey, USA.
SM 5 = NATIONAL ® M2 maltodextrin, available from Ingredion Incorporated, Bridgewater, New Jersey, USA.
SM 6 = ULTRA-SPERSE ® SR modified food starch, available from Ingredion Incorporated, Bridge water, New Jersey, USA.
SM 7 = NATIONAL ® FRIGEX ® HV modified food starch, available from Ingredion Incorporated, Bridgewater, New Jersey, USA,
SM8 = THERMTEX modified food starch, available from Ingredion Incorporated, Bridgewater, New Jersey, USA.

Examples 2-4 and Comparative Example A

Yogurt Compositions

Full protein (3.4% protein) yogurts according to Examples 2-4 and Comparative Example A were produced according the process described above in Example 1c using the formulae described in Table 3 below. Example 2 can be repeated with 1.35% EDWP Starch and 87.50% skim milk. The Gel Strength of each yogurt was measured according to the method set forth in Example 1g. The characteristics and gel strength of each yogurt are provided in Table 4 below.

TABLE 3

Yogurt Formulations

| | | Examples | | |
|---|---|---|---|---|
| Ingredients (wt %) | A | 2 | 3 | 4 |
| Skim Milk | 86.80 | 87.40 | 87.60 | 87.80 |
| Cream (40% fat) | 8.95 | 8.95 | 8.95 | 8.95 |
| Skim Milk Powder | 1.00 | 1.00 | 1.00 | 1.00 |
| SM 2. (Table 2) | 1.25 | 1.25 | 1.25 | 1.25 |
| SM 1 (Table 2) | 2.00 | 0 | 0 | 0 |
| EDWP 1 (Table 1) | 0 | 1.40 | 1.20 | 1.00 |
| Total | 100.00 | 100.00 | 100.00 | 100.00 |

TABLE 4

Yogurt Characteristics and Gel Strength

| Charac-teristic | Example A | Example 2 | Example 3 | Example 4 |
|---|---|---|---|---|
| Syneresis | Some water separation | Some water separation | Some water separation | Some water separation |
| Texture | — | More viscous Than control; initial body similar to control | Softer than control: less initial body | Much softer than control and Ex. 2; less initial body |
| Mouthfeel | — | More pasty and sticky than control | More pasty and sticky than control | More pasty and sticky than control |
| 7-day Gel Strength (g) | 338 | 305 | 285 | 239 |

Prophetic Examples 5 and 6

Pizza Cheese

Pizza cheese (having 6.1% by weight protein) can be produced according to a process as described below using the formulae described in Table 5.

TABLE 5

Pizza Cheese Formulations

| Ingredients (wt %) | Ex. 5 | Ex. 6 |
|---|---|---|
| Water | 45.0 | 45.0 |
| Vegetable Fat | 26.0 | 26.0 |
| Rennet Casein | 6.8 | 6.8 |
| SM 3 (Table 2) | 10.0 | 8.0 |
| SM 4 (Table 2) | 0 | 4.0 |
| EDWP 1 (Table 1) | 2.0 | 2.0 |
| SM 6 (Table 2) | 1.0 | 1.0 |
| SM 5 (Table 2) | 6.0 | 4.0 |
| Salt | 1.5 | 1.5 |
| Emulsifying Salt[1] | 1.0 | 1.0 |
| Mozzarella Flavor[2] | 0.4 | 0.4 |
| Titanium Dioxide | 0.3 | 0.3 |
| Total | 100.0 | 100.0 |

[1]Joba PZ7, available from BK Guilini GmbH, Landenberg, Germany.
[2]Available from Givaudan, East Hanover, New Jersey, USA.

Pizza cheese based on the above formulae can be prepared as follows. The emulsifying salt, titanium dioxide and salt can be hydrated in all of the water and added to the cooker. A premix of casein and all starches can be added to the cooker at 32° C. (90° F.) and mixed for 5 minutes using indirect steam, until homogenous mash potato texture is obtained with low mixing speed. The vegetable fat can be melted and folded in slowly over a 3-4 minute period with mixing at low mixing speed. The temperature can be slowly brought up to 77° C. (170° F.), and the ingredients mixed until homogeneous and plasticized at low mixing speed. The lactic acid and cheese flavor can then be added with mixing and vacuum (10 Hg.) pulled for 3 minutes to remove moisture. The cheese can then be removed from the cooker.

Examples 7-9 and Comparative Example B

Dairy Dessert Compositions

A dairy dessert was produced according to the process described above in 1d using the formulae described in Table 6. The Gel Strength of each Dairy Dessert was measured according to the method set forth in Example 1g. The characteristics and gel strength of each dairy dessert are provided in Table 4 below.

TABLE 6

Dairy Dessert Formulations

| Ingredients (wt %) | Ex. B | Ex. B Negative | Ex. 7 | Ex. 8 | Ex. 9 |
|---|---|---|---|---|---|
| Milk | 82.75 | 84.75 | 82.75 | 82.75 | 83.15 |
| Sugar | 10 | 10 | 10 | 10 | 10 |
| SM7 | 5.25 | 5.25 | 7.25 | 5.25 | 5.25 |
| SM1 | 2.0 | 0.0 | 0.0 | — | — |
| EDWP* | — | — | — | 2.0 | 1.6 |
| Total | 100.00 | 100.00 | 100.00 | 100.00 | 100.00 |

*EDWP with a DE of 4.0 to 5.0.

TABLE 7

Dairy Dessert Characteristics and Gel Strength

| Sample | Gel Strength (g) | Texture Description 7 Days |
|---|---|---|
| Ex. B | 284.2 | Firm, cuttable texture, similar to flan |
| Ex. B Negative | 28 | Flowable, thin texture |
| Ex. 7 | 303 | Pasty, cohesive, sticky texture |
| Ex. 8 | 351 | Firmer than Ex. B, cuttable texture, similar to flan |
| Ex. 9 | 254 | Similar firmness to Ex. B, cuttable texture, similar to flan |

Examples 10a-c and Comparative Example C

Spoonable Dressing Compositions

Spoonable dressings were produced according the process described above in 1e using the formulae described in Table 7 below.

TABLE 7A

Spoonable Dressing Paste Formulations

| Ingredients (wt %) | Ex. C | Ex. C Negative | Ex. 10a | Ex. 10b | Ex. 10c |
|---|---|---|---|---|---|
| Water | 59.74 | 60.74 | 59.74 | 59.74 | 59.94 |
| SM8 | 5 | 5 | 6 | 5 | 5 |
| Vinegar | 12.5 | 12.5 | 12.5 | 12.5 | 12.5 |
| Sugar | 17.7 | 17.7 | 17.7 | 17.7 | 17.7 |
| Mustard powder | 0.35 | 0.35 | 0.35 | 0.35 | 0.35 |
| Paprika | 1 | 1 | 1 | 1 | 1 |
| Salt | 2.6 | 2.6 | 2.6 | 2.6 | 2.6 |
| EDTA | 0.01 | 0.01 | 0.01 | 0.01 | 0.01 |
| Potassium sorbate | 0.1 | 0.1 | 0.1 | 0.1 | 0.1 |
| SM1 (Table 2) | 1 | 0 | 0 | 0 | 0 |
| EDWP* | 0 | 0 | 0 | 1 | 0.8 |
| Total | 100.00 | 100.00 | 100.00 | 100.00 | 100.00 |

*Generic EDWP with a DE from 4.0 to 5.0.

TABLE 7B

Spoonable Dressing Formulations

| Ingredients (wt %) | Ex. C | Ex. C Negative | Ex. 10a | Ex. 10b | Ex. 10c |
|---|---|---|---|---|---|
| Paste from Table A | 65 | 65 | 65 | 65 | 65 |
| Egg Yolks (10% salted) | 5 | 5 | 5 | 5 | 5 |
| Salad oil | 30 | 30 | 30 | 30 | 30 |
| Total | 100.00 | 100.00 | 100.00 | 100.00 | 100.00 |

Viscosity Measurement

The viscosity of spoonable dressings was measured using a Brookfield viscometer, Model DVIIT (Brookfield Viscometer LTD, Harlow, UK) with heliopath as follows. T bar spindle C was used while the measurement was taken at 20 rpm for 30 seconds. A data point was taken every 2 seconds during the 30 second measurement and averaged.

TABLE 7C

Viscosity of Spoonable Dressings

| Sample | 1 Week Viscosity (cP) | 1 Month Viscosity (cP) | Texture Description 7 Days |
|---|---|---|---|
| Ex. C | 16,200 | 13,950 | Firm, spoonable texture. Holds shape on spoon. |
| Ex. C Negative | 15,900 | 14,150 | Thinner than control. Slightly less shape on spoor, vs. Ex. C. |
| Ex. 10a | 26,450 | 23,350 | Pasty, cohesive, sticky texture. |
| Ex. 10b | 19,150 | 18,800 | Firmer than control. Holds shape on spoon. |
| Ex, 10c | 17,650 | 17,700 | Slightly firmer than control. Holds shape on spoon. |

Examples 11-13 and Comparative Example D

Cream Cheese Compositions

Cream cheese was produced according to the process described above in 1f using the formulae described in Table 8. The Gel Strength of each Cream Cheese was measured according to the method set forth in Example 1g. The characteristics and gel strength of each Cream Cheese is provided in Table 9 below.

TABLE 8

Cream Cheese Formulations

| Ingredients (wt %) | Ex. 11 | Ex. 12 | Ex. 13 | Ex. D |
|---|---|---|---|---|
| Water | 28.12 | 28.42 | 28.72 | 28.12 |
| Butter | 25 | 25 | 25 | 25 |
| Quark (0% fat) | 35 | 35 | 35 | 35 |
| Skim Milk Powder | 6 | 6 | 6 | 6 |
| Melting Salt* | 1 | 1 | 1 | 1 |
| Salt | 0.70 | 0.70 | 0.70 | 0.70 |
| SM 2 (Table 2) | 2 | 2 | 2 | 2 |
| SM 1 (Table 1) | 0 | 0 | 0 | 2 |
| EDWP 2 (Table 1) | 2 | 1.70 | 1.40 | 0 |
| Citric Acid | 0.15 | 0.15 | 0.15 | 0.15 |
| Potassium Sorbate | 0.03 | 0.03 | 0.03 | 0.03 |

*TURKISIN ® FK 6 stabiliser, available from BK Guilini GmbH, Landenberg, Germany

TABLE 9

Cream Cheese Sensory; Results and Gel Strength

| | Ex. 11 | Ex. 12 | Ex. 13 | Ex. D |
|---|---|---|---|---|
| Syneresis | None | None | None | None |
| Texture | Firmer and more creamy than control | Slightly softer than control | Much softer than control | — |
| Mouthfeel | More film forming, a bit sticky & smeary | More film forming, a bit sticky & smeary | Slightly more flint forming, a bit sticky & smeary | — |
| 7-Day Gel Strength (g) | 258 | 237 | 219 | 228 |

The above description is for the purpose of teaching the person of ordinary skill in the art how to practice the present invention, and it is not intended to detail all those obvious modifications and variations which will become apparent to the skilled worker upon reading the description. It is intended, however, that all such obvious modifications and variations be included within the scope of the present invention which is defined by the following claims.

What is claimed is:

1. A food composition comprising:
   a. at least one edible ingredient; and
   b. a texturizing agent, wherein said texturizing agent comprises an inhibited starch and a non-granular, enzymatically-debranched waxy potato starch, wherein the inhibited starch and the non-granular, enzymatically-debranched waxy potato starch are present in the texturizing agent in a weight ratio of from 1.0:1.0 to 19.0:1.0, of inhibited starch to non-granular, enzymatically-debranched waxy potato starch;
   wherein the non-granular, enzymatically-debranched waxy potato starch has a dextrose equivalent of from 2.0 to 9.0;
   wherein said composition comprises an effective amount of said texturizing agent to thicken, gel, or thicken and gel said composition; and
   wherein in a control food composition made with a control texturizing agent comprising the inhibited starch and an equal amount of maltodextrin in place of said non-granular, enzymatically-debranched waxy potato starch, said control food composition does not comprise an effective amount of said control texturizing agent to thicken, gel, or thicken and gel said control food composition.

2. The composition of claim 1, wherein the texturizing agent is present in an amount of 0.5% to 15.0%, by weight, of the food composition.

3. The composition of claim 1, wherein the non-granular, enzymatically-debranched waxy potato starch is debranched with an α-1,6-D-glucanohydrolase.

4. The composition of claim 3, wherein the α-1,6-D-glucanohydrolase is an isoamylase EC.3.2.1.68, pullulanase EC.3.2.1.41, or combination thereof.

5. The composition of claim 1, wherein the non-granular, enzymatically-debranched waxy potato starch is partially debranched.

6. The composition of claim 1, wherein the texturizing agent is the sole texturizing agent in the composition.

7. The composition of claim 1, with the proviso that said composition does not contain one or more other texturizing agent or with the proviso that said texturizing agent is the sole texturizing agent in the composition.

8. The composition of claim 1, wherein the composition is selected from a yogurt composition, cheese composition, cream cheese composition, dairy dessert composition, and oil-in-water emulsion composition.

9. A texturizing agent comprising an inhibited starch and a non-granular, enzymatically-debranched waxy potato starch, wherein the weight ratio of inhibited starch to non-granular, enzymatically-debranched waxy potato starch is from 1.0:1.0 to 19.0:1.0, and wherein the non-granular, enzymatically-debranched waxy potato starch has a dextrose equivalent of from 2.0 to 9.0.

\* \* \* \* \*